United States Patent [19]
Lancelot et al.

[11] 3,887,526
[45] June 3, 1975

[54] PROCESS FOR THE HOMOPOLYMERIZATION OF MALEIC ANHYDRIDE

[75] Inventors: Charles J. Lancelot, Hightstown; John H. Blumbergs, Highland Park, both of N.J.; Donald G. MacKellar, Yardley, Pa.

[73] Assignee: FMC Corporation, New York, N.Y.

[22] Filed: May 23, 1973

[21] Appl. No.: 363,015

Related U.S. Application Data

[63] Continuation of Ser. No. 248,880, May 1, 1972, Continuation-in-part of Ser. No. 51,730, July 1, 1970, abandoned.

[52] U.S. Cl............................................. 260/78.4 R
[51] Int. Cl.............................. C08f 1/11; C08f 3/48
[58] Field of Search ................................ 260/78.4 R

[56] References Cited
UNITED STATES PATENTS

| | | | |
|---|---|---|---|
| 3,178,395 | 4/1965 | Muskat | 260/78.5 |
| 3,457,240 | 7/1969 | Heuck et al. | 260/78.4 |
| 3,557,065 | 1/1971 | Blumberg et al. | 260/78.4 |

*Primary Examiner*—Joseph L. Schofer
*Assistant Examiner*—John Kight, III
*Attorney, Agent, or Firm*—Thomas B. Graham

[57] ABSTRACT

A method for the homopolymerization of maleic anhydride which comprises the controlled addition of a heated mixture of maleic anhydride, a polymerization initiator and a solvent for the monomer but not the polymer to a heated reaction zone containing a dilute solution of maleic anhydride in the identical solvent whereby the polymerization of the monomer and the precipitation of the polymer occur virtually simultaneously upon introduction of the feed monomer into the reaction zone. Maleic anhydride homopolymer and derivatives thereof may be effectively utilized in a wide variety of applications and, notably, as detergent builders and surface active agents.

8 Claims, No Drawings

PROCESS FOR THE HOMOPOLYMERIZATION OF MALEIC ANHYDRIDE

RELATED APPLICATIONS

This application is a continuation of our copending application Ser. No. 248,880 filed May 1, 1972, which in turn is a continuation-in-part of application Ser. No. 51,730 filed July 1, 1970, now abandoned, and assigned to the assignee of the instant application.

BACKGROUND OF THE INVENTION

Recently developed methods for homopolymerizing maleic anhydride are well known to those skilled in the art. Typical methods may be found in U.S. Pat. Nos. 3,359,246 and 3,385,834 wherein the homopolymerization procedures involve reacting molten maleic anhydride in the presence of such free radical initiators as acetyl peroxide, benzoyl peroxide and di-tert-butyl peroxide. In addition, U.S. Pat. No. 3,427,233 teaches an electrolytically induced, ionic solution homopolymerization technique while U.S. Pat. No. 3,186,972 teaches the use of cobalt 60 radiation in the preparation of the homopolymer. Furthermore, U.S. Pat. No. 3,457,240 teaches the use of a batch solution process utilizing various free radical polymerization catalysts.

Difficulties have, however, been encountered in conducting these prior art processes. Initially, it must be noted that these prior art processes are either bulk or batch solution processes. Since the polymerization reaction is exothermic (14 kcal./mole), all bulk processes suffer a serious disadvantage in the difficulty encountered in the removal of this heat of reaction, particularly as the reaction viscosity increases in the latter stages of the reaction making heat exchange extremely inefficient. These problems of heat exchange are greatly multiplied when it is desired to scale-up the process to a commercial level. Bulk polymerization processes are also disadvantageous inasmuch as they require extended polymerization periods and cumbersome isolation techniques. Thus, a typical bulk run requires a precipitation step, followed by a minimum of two reslurry steps in order to convert the product to a solid, essentially monomer-free polymer.

In addition, the polymeric products produced heretofore have generally exhibited an undesirable dark coloration which have proven to be a decided deterrent to their use in textile and detergent applications and the like. Accordingly, the dark colored products have been found unsuitable for use in applications wherein, otherwise they exhibit excellent performance characteristic.

While some of these difficulties are overcome in batch solution homopolymerization processes under precipitation conditions, the constant high monomer level in the reactor at commercially practical concentrations results in the separation of the insoluble homopolymer as a gummy, tacky mixture containing unreacted monomer. Needless to say, the isolation of the homopolymer in this form is totally unsatisfactory.

SUMMARY OF THE INVENTION

It is the prime object of this invention to provide a simple, efficient method for the homopolymerization of maleic anhydride which substantially overcomes the disadvantages inherent in the prior art processes.

It is a further object to provide poly(maleic anhydride) which is substantially devoid of undesirable coloration and monomer contamination.

Various other objects and advantages of this invention will become apparent to the practitioner from the following detailed description thereof.

We have now surprisingly found that the disadvantages of the prior art processes may be overcome by combining a controlled monomer feed with a precipitation polymerization technique in preparing poly(maleic anhydride). Thus, a heated mixture of maleic anhydride, initiator and solvent is passed into a heated reaction zone containing a dilute maleic anhydride solution. Formation and precipitation of the homopolymer occurs rapidly and virtually simultaneously. As a result of this feed introduction method, the monomer level in the reaction zone is maintained at a relatively constant, low equilibrium level. This low level minimizes the reaction heat and the problems attendant thereto and prevents gum formation by the collected homopolymer. The immediate separation of the homopolymer from the active polymerization medium by precipitation prevents the color formation, thereby facilitating the recovery of a pure white powder. The light color enables the poly(maleic anhydride) to be used in a variety of applications for which it was previously unsuitable because of its dark color. Finally, since the product precipitates on formation, simple filtration followed by washing is sufficient to isolate the pure product.

DESCRIPTION OF THE PREFERRED EMBODIMENTS

In conducting the novel process of this invention, the required reactants include the maleic anhydride monomer, the polymerization initiator and a solvent which functions as such solely for the monomer and not for the polymer.

The applicable polymerization initiators are unsymmetrical peroxides, notably acyl maleyl peroxides, such as acetyl maleyl, trifluoro acetyl maleyl, propionyl maleyl, cyclohexyl maleyl, benzoyl maleyl peroxides and the like.

The above initiator may either be introduced fully prepared or, if desired, may be generated in the feed system prior to the introduction of the feed into the reaction zone. Such in-situ formation may be accomplished by any of several convenient methods utilizing suitable proportions of the necessary reagents to generate the desired amount of initiator. For example, acetyl maleyl perioxide results from the interaction of maleic anhydride and hydrogen peroxide which produces permaleic acid, followed by the addition of acetic anhydride which reacts with the permaleic acid to from the acetyl maleyl peroxide. This in-situ preparation is illustrated by the following equations:

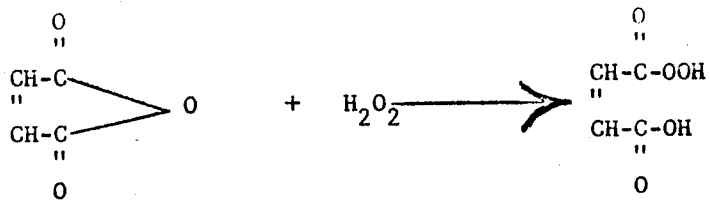

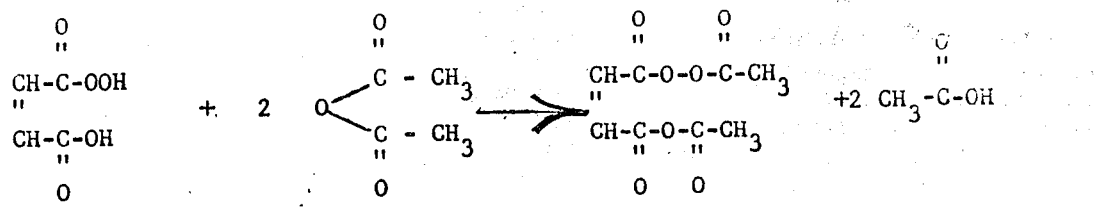

These in-situ reactions are catalyzed by boron compounds, such as boric oxide, which also aid in preventing the discoloration of the homopolymeric product. Additional information with regard to the in-situ formation of such acyl maleyl peroxides and the function served by the boric acid compound may be found in our copending application Ser. No. 862,059, filed Sept. 29, 1969, now U.S. Pat. No. 3,557,065.

It should be further noted that when acylating agents are used in the in-situ preparation of diacyl perioxides, the by-product carboxylic acid should not be allowed to accumulate in the reaction zone. Thus, a concentration in excess of about 2% of said acid has a deleterious effect on the finely divided form of the polymer precipitate by causing agglomeration of the product into tacky lumps. Accordingly, the acylation agent is preferably one which gives rise to a relatively volatile carboxylic acid by-product; the latter being removed from the reaction zone by distillation which is aided either by sweeping the reaction with an inert gas such as nitrogen or by applying slight vacuum to the zone.

As previously indicated, the solvent is selected for its ability to dissolve, at reaction temperatures, the maleic anhydride monomer but not the homopolymeric product. It is also desirable that the reaction can be conducted at the most desirable polymerization temperatures. Finally, the solvent should be neither one which can react with the anhydride group (e.g. alcohols), nor one which can interfere with the course of the free radical chain process, as, for example, by acting as a chain transfer agent, unless it is desired to obtain low molecular weight polymers. Solvents which meet these criteria and thus are suitable for use in the novel process of this invention include: polychlorinated aliphatic hydrocarbons such as carbon tetrachloride, polychloroethanes, and polychloropropanes; aromatic hydrocarbons such as benzene, naphthalene, and biphenyl; alkylbenzenes such as toluene and the xylenes; chlorinated aromatic hydrocarbons such as mono-and polychlorobenzenes, chlorotoluenes, and chloroxylenes; and ethers such as di-n-propyl ether, di-n-butyl ether and diphenyl ether.

The actual homopolymerization procedure involves preparing the feed material by mixing the maleic anhydride, the initiator, the boric acid compound and the solvent. The in-situ formation of the initiator is conducted at this stage of the process by the reaction of the suitable reagents. The feed system is maintained at a temperature of from about 38° to 50°C. prior to its introduction into the reaction zone. Temperatures below about 38°C. are undesirable inasmuch as crystallization of the monomer occurs at these lower temperatures. On the other hand, temperatures above about 50°C. are also undesirable inasmuch as polymerization begins to occur, thereby yellowing the color of the feed system.

The heated system is then introduced into the reaction zone containing a dilute solution of maleic anhydride in the same solvent as is present in the feed. The concentration of maleic anhydride in this solution will generally range from about 0 to 25%, by weight. In order to maintain a low equilibrium level of monomer in the reacton zone, the feed is added at a controlled rate which may be determined by the practitioner depending on his particular system, although typical feed rates may range from about 100 to 500 grams per liter per hour.

The monomer is polymerized essentially upon introduction into the reaction zone accompanied by the immediate precipitation of the formed homopolymer. The polymerization reaction is conducted at a temperature of between about 75°C. and the boiling point of the solvent, preferably in the range of 75° to 150°C. depending on the particular catalyst used. The polymer product can be removed either continuously during the course of the reaction or batchwise. Subsequent filtration and washing provides a light colored poly(maleic anhydride) in yields which generally exceed 85%. The resulting homopolymer may thereafter be hydrolyzed to poly(maleic acid) and other derivatives by means of procedures well known to those skilled in the art.

With respect to proportions, the concentration of maleic anhydride in the feed system will generally range from about 50 to 75%, by weight, while the concentration of initiator therein will generally range from about 0.2 to 10.0%, based on the weight of maleic anhydride in the feed system, depending on the activity of the initiator employed. As previously indicated, the concentration of maleic anhydride in solution in the reaction zone will generally range from about 0 to 25%, by weight.

The continuous method of operation and the economy of the instant process can be improved by recycling the monomer-enriched mother liquor recovered after filtration of the polymer product and utilizing this recylcle as the monomer solution in the reaction zone. Any concentration adjustments that are required may be made by merely adding the appropriate amount of monomer or solvent.

The following examples will further illustrate the embodiment of this invention. In these examples, all parts given are by weight unless otherwise noted.

EXAMPLE 1

This example illustrates the novel process of this invention wherein the free radical initiator was prepared by means of an in-situ technique.

A mixture of 125 parts maleic anhydride, 35 parts monochlorobenzene, 18.6 parts acetic anhydride and 1.25 parts boric oxide, maintained at a temperature of 40°C., was agitated with a stream of nitrogen whereupon 3.1 parts of 90% hydrogen peroxide were slowly admixed therewith. Within a period of 10 minutes, the temperature of the blend had risen to 52°C. and then began to recede to 40°C., thereby indicating completion of the preparation of the peroxide initiator.

The resulting feed mixture was then introduced, over a period of 1.33 hours, into a reaction zone containing 200 parts of a 20%, by weight, solution of maleic anhydride into mono-chlorobenzene. The reaction zone was maintained at a temperature of 105°–107°C. and was continuously flushed with nitrogen. Precipitation of the homopolymer occured almost immediately upon introduction of the feed mixture. the polymerization reaction was allowed to continue for an additional 30 minutes at 107°C., whereupon accumulated precipitate was removed and washed. The poly(maleic anhydride) was recovered as a white solid in a yield of 87%, based on the monomer feed.

EXAMPLE II

The recipes set forth in the following table were utilized to prepare poly(maleic anhydride) by means of the generaly procedure described in Example I, hereinabove.

| Feed Mixture | Parts | |
|---|---|---|
| | 1 | 2 |
| Maleic anhydride | 625 | 625 |
| o-dichlorobenzene | 225 | 225 |
| boric oxide | 6.25 | 6.25 |
| hydrogen peroxide (90%) | 15 | 10 |
| acetic anhydride | 93 | 62 |
| temperature (°C.) | 40–45 | 43 |
| addition time (hours) | 2.33 | 2.33 |
| Reaction Zone | | |
| Maleic anhydride | 225 | 225 |
| o-dichlorobenzene | 1275 | 1275 |
| total polymerization time (hours) | 2.83 | 2.83 |
| polymerization temperature (°C.) | 105–107 | 105–107 |
| polymer yield (%) | 97 | 93 |

The data summarized above further emphasize the effectiveness of the novel process of this invention in preparing poly(maleic anhydride).

EXAMPLE III

The recipes set forth in the following table were utilized to prepare poly(maleic anhydride) by means of the general procedure described in Example I, hereinabove.

The tetraacetyl diborate was prepared by reacting acetic anhydride and boric acid in accorddance with the procedure by Gerrard and Whelan in the June 24, 1954 issue of Chemistry and Industry at pages 758–759.

EXAMPLE IV

This example demonstrates a continuous operation by the novel process of the present invention.

A 3-liter, steam-jacketed flask was charged with 225 parts of maleic anhydride dissolved in 1275 parts of o-dichlorobenzene. This solution was maintained at 100°–110°C. and was used as the reaction zone for the continuous homopolymerization of maleic anhydride.

The monomer feed was prepared as described in Example II from 312 parts of maleic anhydride and 110 parts of o-dichlorobenzene, to which were added 0.8 parts of boric oxide, 7.5 parts of 90% hydrogen peroxide and 47 parts of acetic anhydride. A fresh monomer charge was prepared every 1.5 hours and maintained in a separate vessel at 40°–45°C. before use. The monomer was fed to the reaction zone over a period of 12 hours at a rate of 325–350 parts of total feed mixture per hour per liter of reaction zone.

The by-product, acetic acid, formed in the catalyst perparation, was removed by applying a slight vacuum, 650–700 mm. Hg. to the reaction zone.

After 1 hour of operation, and at half-hour intervals thereafter, approximately 300 ml. portions of reaction slurry was transferred by suction from the reaction zone into a 1-liter, steam jacketed, hold-up reactor, maintained at 100°C. The hold-up reactor was emptied at 1-hour intervals and the reaction mixture transferred to a filtering centrifuge to separate the finely divided, white solid polymer product.

The cake on the centrifuge was rinsed with 130 parts of fresh o-dichlorobenzene. The combined filtrates were recycled to the reaction zone, adding fresh o-dichlorobenzene as necessary to maintain the reaction zone at approximately 1500 parts of reaction mixture.

After 12 hours of operation, a total of 3120 parts of maleic anhydride were charged into the reaction zone and 3420 parts of crude poly(maleic anhydride) were obtained. After removal of the monomer, the purified polymer product was obtained as a white powder, 3100 parts of 99.4% based on monomer feed over the reaction period.

| Feed Mixture | Parts | | |
|---|---|---|---|
| | 1 | 2 | 3 |
| Maleic anhydride | 625 | 625 | 625 |
| Carbon tetrachloride | 225 | | |
| toluene | | 225 | |
| o-dichlorobenzene | | | 225 |
| boric oxide | 6.25 | | 6.25 |
| tetraacetyldiborate | | 150 | |
| hydrogen perioxide (90%) | 15 | 15 | 15 |
| trifluoroacetic anhydride | 140 | | |
| Benzoic anhydride | | | 150 |
| temperature (°C.) | 38–40 | 40–42 | 43–45 |
| Addition time (hours) | 2.33 | 2.33 | 2.33 |
| Reaction Zone | | | |
| Maleic anhydride | 225 | 225 | 225 |
| Carbon tetrachloride | 1500 | | |
| Toluene | | 1000 | |
| o-dichlorobenzene | | | 1300 |
| total polymerization time (hours) | 2.83 | 2.83 | 2.83 |
| polymerization temperature (°C.) | 75–78 | 100–105 | 140–150 |
| polymer yield (%) | 96 | 94 | 87 |

Summarizing, it is seen that this invention provides a novel process for the preparation of pure, light colored poly(maleic anhydride).

Variations may be made in proportion, procedures and materials without departing from the scope of this invention which is defined by the following claims.

What is claimed is:

1. A process for the preparation of poly(maleic anhydride) which comprises, adding at a controlled feed rate in the range from about 100 to 500 grams/liter/hour a feed mixture maintained at about 38°–50° C. which consists of maleic anhydride, an unsymmetrical acyl-maleyl peroxide initiator and a maleic anhydride solvent in which the maleic anhydride polymer product in insoluble.

to a polymerication reaction zone wherein is maintained a solvent system consisting essentially of a maleic anhydride solvent and about 0 to 25%, by weight, of maleic anhydride in solution, said reaction zone being maintained at polymerization temperature, precipitating poly(maleic anhydride) in the maleic anhydride solvent medium contained in a said reaction zone, and recovering and isolating the poly(maleic anhydride) product.

2. The process of claim 1, wherein said maleic anhydride polymerization is carried out in the presence of a boric acid compound.

3. The process of claim 2, wherein said initiator is present in a concentration of from about 0.2 to 10.0%, based on the weight of maleic anhydride in the feed mixture.

4. The process of claim 3, wherein said initiator is formed in-situ.

5. The process of claim 1, wherein said solvent is selected from the group consisting of polychlorinated aliphatic hydrocarbons, aromatic hydrocarbons, alkylbenzenes, chlorinated aromatic hydrocarbons, and ethers.

6. The process of claim 1, wherein said feed mixture is at a temperature of from about 38° to 50° C. while being introduced into said reaction zone which in turn is maintained at a temperature between 75° up to the boiling point of solvent.

7. The process of claim 4, wherein boric oxide is present in said feed mixture.

8. The process of claim 1, where monomer-enriched mother liquor recovered upon isolating the poly(maleic anhydride) is admixed with additional maleic solvent such that upon return of said mother liquor to said polymerization reaction zone as the solvent system therein, the composition and volume of the solvent system is at substantially the same level as it was at the initiation of the polymerization reaction.

* * * * *

UNITED STATES PATENT OFFICE
CERTIFICATE OF CORRECTION

PATENT NO. : 3,887,526
DATED : June 3, 1975
INVENTOR(S) : Charles J. Lancelot, John H. Blumbergs and Donald G. MacKellar It is certified that error appears in the above-identified patent and that said Letters Patent are hereby corrected as shown below:

Column 2, line 56, "perioxide" should read --peroxide--.

Column 2, line 59, "from" should read --form--.

Column 4, line 49, "recylcle" should read --recycle--.

Column 5, line 6, "into" should read --in--.

Column 5, line 10, "the" should read --The--, second occurrence.

Column 5, line 21, "generaly" should read --general--.

Column 6, line 2, "accorddance" should read --accordance--.

Column 6, line 27, "perparation" should read --preparation--.

Column 6, line 36, "white" should read --white,--.

Column 7, line 16, "in" should read --is--.

UNITED STATES PATENT OFFICE
CERTIFICATE OF CORRECTION

PATENT NO. : 3,887,526
DATED : June 3, 1975
INVENTOR(S) : Charles J. Lancelot, John H. Blumbergs and Donald G. MacKellar It is certified that error appears in the above-identified patent and that said Letters Patent are hereby corrected as shown below:

Column 7, line 24, "in a said" should read --in said--.

Column 8, line 23, "maleic solvent" should read --maleic anhydride solvent--.

Signed and Sealed this fifteenth Day of June 1976

[SEAL]

Attest:

RUTH C. MASON
Attesting Officer

C. MARSHALL DANN
Commissioner of Patents and Trademarks